UNITED STATES PATENT OFFICE.

OSCAR FRÖLICH, OF BERLIN, GERMANY.

PROCESS OF EXTRACTING COPPER.

No. 846,657. Specification of Letters Patent. Patented March 12, 1907.

Application filed March 12, 1906. Serial No. 305,579.

*To all whom it may concern:*

Be it known that I, OSCAR FRÖLICH, natural philosopher, a citizen of the Swiss Republic, residing at Berlin W. 15, Fasanenstrasse 48, Germany, have invented certain new and useful Improvements in Processes for Extracting Copper from Copper Ores and Smelting Products; and I do hereby declare the following to be a full, clear, and exact description of the invention, such as will enable others skilled in the art to which it appertains to make and use the same.

My invention refers to the art of extracting copper from its ores or from smelting products, and consists in the process hereinafter described.

In my process all roasting and smelting is omitted, and after a certain preparation of the ores and smelting products the copper is obtained by chlorination with chlorinating-gases, then by leaching with water, and finally by extracting the copper out of the solution by cementation—viz., treating with iron in a rotating apparatus.

According to my invention I prepare the copper ores and smelting products by heating them, without admitting air, to a temperature between 150° and 800° centigrade, and thereby driving off the loose sulfur—viz., the sulfur which goes off by distillation of the ore or smelting product without admission of air. The pyrite is by this operation changed in its chemical composition and after this treatment can be chlorinated much quicker and better than in its normal state.

The chlorinating-gases I use are chlorin, vapor of hydrochloric acid and of ferric chlorid. The chlorin and the ferric chlorid attack the sulfur compounds of copper, the hydrochloric acid and the ferric chlorid attack the oxids of copper in the ores and smelting products. The quantities of the gases and vapors in the mixture are regulated according to the different combination of copper that may be present in the ore. The chlorinating mixture may also contain steam. I prefer to regulate the temperature of the chlorination somewhat higher than the boiling temperature of the ferric chlorid, about 300° centigrade; but it can be lower if the copper in the ore only occurs in combination with sulfur, and in that case I use chlorin gas only.

If the ores and smelting products are poor in sulfur and it is therefore not important to collect the sulfur, the operations of heating without air and of the chlorination may be combined by regulating the temperature of the chlorination in such a way that the loose sulfur is also driven off—that is, a temperature of about 150° centigrade and more.

If iron is present in the ore or smelting products, it is chlorinated, together with the copper, and this process is facilitated in a measure as the temperature is higher; but the chlorination of the copper takes place quicker than that of the iron. In case I desire to chlorinate all the iron in order finally to obtain all the sulfur I extend the time of chlorination more than is needed to chlorinate the copper only.

In order to regain the chlorin combined with the iron, the ore or smelting product is after chlorination heated to about 300° and more, and a certain quantity of air is introduced during the operation. The ferric chlorid is then evaporated and by the air separated into oxid of iron and chlorin gas, which are both collected. The chlorid of copper is not changed by this operation. Then the ore or smelting product is treated with hot water, the chlorid of copper and perhaps a residue of the ferric chlorid are thereby extracted, the solution is introduced into a rotating apparatus containing pieces of iron, and the metallic copper is obtained as cementated copper.

After the copper is obtained the chlorin in the solution, which contains mainly ferrochlorid, should be regained. For this purpose the solution is in a rotating apparatus oxidized to ferric chlorid by introducing air into the solution. Then the water and water of crystallization is driven off by heat, and by increasing the temperature over the boiling-point of ferric chlorid and introducing a certain quantity of air gaseous chlorin and ferrochlorid are obtained. If in this operation hydrochloric acid is formed, it can be transformed into chlorin by treating with calcium hypochlorite.

If the driving off of the loose sulfur and the chlorination are combined, a part of the sulfur is chlorinated and can be taken off and treated by hot water. Dioxid of sulfur and hydrochloric acid are formed. This portion of hydrochloric acid can be also transformed into chlorin.

The sulfur which remains combined with copper and iron after the loose part of the sulfur is driven off is freed when the copper and iron are chlorinated and leached off. It is obtained by heating the remaining part of the ore over 448°, the boiling temperature of sulfur, and driving off this part of the sulfur.

If the ores or smelting products contain silver and gold, these metals are also chlorinated, together with copper and iron, and can be obtained by the known methods.

If lead and zinc are present in the ores or smelting products, the zinc is chlorinated with copper and iron and leached out. It can be obtained by differential crystallization and other known means. Lead is chlorinated only very little and remains in the solid part of the ore. By this method the chlorin is regained completely or almost completely, the copper is obtained completely or almost completely in a cementated state, the greater part of the iron as oxid of iron and of the sulfur as solid sulfur. The expense consists in iron for cementation, and calcium hypochlorite for the transformation of hydrochloric acid into chlorin.

All operations need only short time—the preparation and the driving off of the loose sulfur, one half to one hour; the chlorination, two to three hours; the driving off of the ferric chlorid, one-half to one hour; the distillation of the combined sulfur, one-half to one hour; the cementation in a good rotating apparatus, one hour to one and a half hours. Consequently the apparatus need only contain a small part of the daily production.

This method can be applied with very good results as to copper and with considerably smaller costs than other methods to the poorest ores and smelting products, as well as to richer ones. Its advantages are avoiding the use of sulfurous acid, of roasting and smelting, of the slow disintegration by air and water, relatively small size of the apparatus, small expense for mechanical power and labor, small duration of the operations, possibility of placing the works in the neighborhood of the mine.

Having thus described the nature of my said invention and the best means I know of carrying the same into practical effect, I claim—

1. A method of extracting copper from copper ores and smelting products, which method consists in first heating the said products without admission of air to a temperature, by which the loose sulfur is driven off, then chlorinating at a temperature between 0° centigrade and 350° centigrade by means of chlorinating-gases.

2. A method of extracting copper from copper ores and smelting products, which method consists in first heating the said products without admission of air to a temperature, by which the loose sulfur is driven off, then treating it with gaseous chlorin, hydrochloric acid and ferric chlorid at a temperature between 0° and 350° centigrade.

3. A method of extracting copper from copper ores and smelting products, which method consists in first heating the said products without admission of air, to a temperature, by which the loose sulfur is driven off, then treating with gaseous chlorin, hydrochloric acid and ferric chlorid at a temperature between 0° and 350° centigrade then adding air at a temperature higher than the boiling-point of ferric chlorid, and finally collecting the chlorinating-gases thus formed.

4. A method of extracting copper from copper ores and smelting products, which method consists in first heating the said products without admission of air, to a temperature, by which the loose sulfur is driven off, then treating with gaseous chlorin, hydrochloric acid and ferric chlorid at a temperature between 0° and 350° centigrade then adding air at a temperature higher than the boiling-point of ferric chlorid, collecting the chlorinating-gases formed, leaching with water and finally introducing the solution into a rotating apparatus, containing iron.

5. A method of extracting copper from copper ores and smelting products, which method consists in first heating the said products without admission of air to a temperature by which the loose sulfur is driven off, then treating with gaseous chlorin, hydrochloric acid and ferric chlorid at a temperature between 0° and 350° centigrade then adding air at a temperature higher than the boiling-point of ferric chlorid, then collecting the chlorinating-gases formed, leaching with water and introducing the solution into a rotating apparatus, containing iron, after the deposition of copper oxidizing the remaining solution in a rotating apparatus by an air-blast, then driving off the water and the water of crystallization by heating, and finally regaining the chlorinating-gases by introducing a limited quantity of air.

6. The method of extracting copper from copper ores and smelting products, which method consists in first heating the said products without admission of air to a temperature by which the loose sulfur is driven off, then treating with gaseous chlorin, hydrochloric acid and ferric chlorid at a temperature between 0° and 350° centigrade, then adding air at a temperature higher than the boiling-point of ferric chlorid, then collecting the chlorinating-gases formed, leaching with water introducing the solution into a rotating apparatus containing iron, after the deposition of copper, oxidizing the remaining solution in a rotating apparatus by an air-blast, then by driving off the water and the water of crystallization by heating, and regaining the chlorinating-gases by introducing a limited quantity of air and treating the chlorinated sulfur, obtained during the chlorination, with hot water.

7. The method of extracting copper from copper ores and smelting products, which method consists in first heating the said products without admission of air to a temperature by which the loose sulfur is driven off, then treating with gaseous chlorin, hydrochloric acid and ferric chlorid at a temperature between 0° and 350° centigrade, then adding air at a temperature higher than the boiling-point of ferric chlorid, then collecting the chlorinating-gases formed, leaching with water and introducing the solution into a rotating apparatus containing iron and after the deposit of copper, oxidizing the remaining solution in a rotating apparatus by an air-blast, then driving off the water and the water of crystallization by heating, and regaining the chlorinating-gases by introducing a limited quantity of air, treating the chlorinated sulfur, obtained during the chlorination with hot water, finally after taking off of copper and iron, heating the remaining part of the ore above the boiling temperature of sulfur and distilling the sulfur formerly combined to the copper and the iron.

In testimony whereof I have affixed my signature in presence of two witnesses.

OSCAR FRÖLICH.

Witnesses:
HENRY HASPER,
WOLDEMAR HAUPT.